(12) United States Patent
Hoffmann et al.

(10) Patent No.: US 7,300,996 B2
(45) Date of Patent: Nov. 27, 2007

(54) REACTIVE HOT MELT ADHESIVE

(75) Inventors: Horst Hoffmann, Kirchheim (DE); Uwe Franken, Dormagen (DE); Michael Krebs, Hilden (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/817,558

(22) Filed: Apr. 2, 2004

(65) Prior Publication Data

US 2005/0033004 A1 Feb. 10, 2005

Related U.S. Application Data

(63) Continuation of application No. PCT/EP02/10804, filed on Sep. 26, 2002.

(51) Int. Cl.
- *C08G 18/10* (2006.01)
- *C09J 175/04* (2006.01)
- *C09J 5/00* (2006.01)
- *B32B 27/40* (2006.01)

(52) U.S. Cl. .................. 528/60; 156/331.7; 156/306.6; 428/423.1; 428/425.1

(58) Field of Classification Search ............. 428/424.7, 428/424.6, 424.8, 424.4, 425.1, 425.8
See application file for complete search history.

(56) References Cited

U.S. PATENT DOCUMENTS

| | | | |
|---|---|---|---|
| 4,743,509 A * | 5/1988 | Vladimiro ................ 428/425.1 |
| 5,021,507 A | 6/1991 | Stanley et al. |
| 5,827,926 A | 10/1998 | Shimizu |
| 5,866,656 A | 2/1999 | Hung et al. |
| 5,869,593 A | 2/1999 | Helmeke et al. |
| 5,922,805 A | 7/1999 | Bouttefort et al. |
| 6,218,471 B1 | 4/2001 | Chenard et al. |
| 6,221,978 B1 | 4/2001 | Li et al. |
| 6,333,094 B1 * | 12/2001 | Schneider et al. .......... 428/201 |
| 6,440,546 B1 * | 8/2002 | Fields et al. ................ 428/220 |
| 6,465,104 B1 | 10/2002 | Krebs et al. |
| 6,482,878 B1 | 11/2002 | Chu |
| 2003/0004263 A1 | 1/2003 | Schmidt, Jr. et al. |
| 2003/0008970 A1 | 1/2003 | Rumack |
| 2003/0010442 A1 | 1/2003 | Nowicki et al. |
| 2003/0010443 A1 | 1/2003 | Rumack |
| 2003/0022973 A1 | 1/2003 | Hung et al. |
| 2003/0212235 A1 | 11/2003 | Nowicki et al. |
| 2003/0213557 A1 | 11/2003 | Nowicki et al. |
| 2004/0072952 A1 | 4/2004 | Hung et al. |
| 2004/0072953 A1 | 4/2004 | Hung et al. |
| 2004/0079482 A1 | 4/2004 | Zhang et al. |
| 2004/0198899 A1 | 10/2004 | Hung et al. |

FOREIGN PATENT DOCUMENTS

| | | |
|---|---|---|
| CA | 2 392 960 A1 | 6/2001 |
| DE | 198 26 329 A1 | 12/1999 |
| DE | 199 63 585 A1 | 7/2001 |
| DE | 41 36 490 C2 | 4/2003 |
| EP | 0 343 491 B1 | 6/1993 |
| WO | WO 99/28363 A1 | 6/1999 |
| WO | WO 99/46358 A1 | 9/1999 |
| WO | WO 01/40342 A1 | 6/2001 |

* cited by examiner

*Primary Examiner*—James J. Seidleck
*Assistant Examiner*—Saira B. Haider
(74) *Attorney, Agent, or Firm*—Stephen D. Harper

(57) ABSTRACT

One-component moisture-curing hot melt adhesive compositions based on reaction products from di- or polyisocyanates and polyether-polyols, crystalline or partly crystalline polyester-polyols and low molecular weight polymers from olefinically unsaturated monomers and optionally hydroxylated tackifying resins are suitable for high-strength and ageing-resistant gluing of profiles of plastics to one- or multilayer acrylate films.

17 Claims, No Drawings

REACTIVE HOT MELT ADHESIVE

This application is a continuation under 35 USC Sections 365(c) and 120 of International Application No. PCT/EP02/10804, filed 26 Sep. 2002 and published 17 Apr. 2003 as WO 03/031490, which claims priority from German Application No. 10149142.5, filed 5 Oct. 2001, each of which is incorporated herein by reference in its entirety.

FIELD OF THE INVENTION

The invention relates to modified, one-component, moisture-curing polyurethane hot melt adhesives and their use for laminating films onto plastic, wood, derived timber products, metals, stone or similar materials.

DISCUSSION OF THE RELATED ART

A colored or patterned surface film is often applied to the surface of objects, such as e.g. window profiles, doors, frameworks and housings of plastic, wood, derived timber products, metals or similar materials in order thus on the one hand to protect the surface of the objects against damaging influences, such as e.g. corrosion, discoloration by light or mechanical effects. Another reason for application of the surface film can be to make the surface of the object more appealing.

For example, if an appropriately patterned film is used, the impression of valuable wood can be generated, even if a material which, because of its visual appearance, structure, surface or color, would not be suitable for this use is actually used. A surface film applied in such a way should thus protect the surface of the object from environmental influences, such as e.g. the effects of water, moisture, change in temperature or light, in particular sunlight, or also environmentally harmful substances in the atmosphere.

In window and door construction, profiles of plastic, in particular profiles of thermoplastic materials, such as polyvinyl chloride (PVC), polypropylene (PP) and acrylonitrile/butadiene/styrene copolymers (ABS), have found wide use, whether for complete, hollow or core profiles, because of their ease of preparation by the extrusion process, their low costs and their good properties in use. In the case of PVC, the PVC to be used here can be either plasticized or semi-rigid or, in particular, rigid PVC. The surface films used are either PVC films, CPL (continuous pressure laminates) and HPL (high pressure laminates) films, (printed) paper, veneer or other sheet-like structures, which as a rule have a thickness of 0.1 to 1.0 mm. For efficient production processes, a high initial adhesive strength after a very short time with an even greater final strength of the gluing are required. These requirements are met in an excellent manner by reactive polyurethane hot melt adhesives, but pretreatment with an adhesion-promoting layer is necessary for this on many surfaces of plastics. The application of the adhesion-promoting layer is said to allow high production rates here and nevertheless be environmentally-friendly.

The adhesion-promoting layer can be achieved here with the aid of a plasma or corona pretreatment, but adhesion-promoting primer coats in the form of primers, e.g. water-based primers, such as are disclosed in DE-A-19826329, can also be applied.

An adhesion-promoting surface pretreatment of the surfaces of plastics or films of plastics can also be carried out with the aid of the cleaning composition described in WO 99/46352. In this case, the cleaned surfaces of plastics can also be subjected to a further mechanical, physical, chemical or electrochemical pretreatment before the gluing. This can be, in particular, application of an adhesion promoter or primer, e.g. of the abovementioned type, or a pretreatment by flaming or by a corona treatment can be carried out.

For many gluings of surface films with the abovementioned substrates of plastics, derived timber products or aluminum materials, completely satisfactory results are achieved.

In the field of exterior applications, newer films which are particularly resistant to weathering and light-stable are increasingly being proposed. These are, in particular, films based on (meth)acrylates, in particular mixtures of various polymethacrylate homo- and copolymers. One advantage of the use of poly(meth)acrylate films is that films of different hardnesses (from brittle-hard to high flexibility) can easily be produced by suitable choice of the comonomers. Another advantage is to be seen in the fact that the usual, highly light-fast organic pigments or also iron-, chromium- or nickel-containing pigments can be used for pigmenting such films.

The good resistance to weathering and UV of such poly(meth)acrylate films is known. Surface films constructed as multilayer films have recently been proposed to further improve the stability to light and weathering. Thus, EP-A-343491 proposes multilayer films of a (meth)acrylate base film with a glass-clear polyacrylate top film and a further glass-clear protective film of polyvinylidene fluoride (PVDF) or polyvinyl fluoride (PVF).

Such 1- or multilayer surface films based on acrylates or methacrylates indeed have an excellent resistance to light and weathering, but permanent weather-resistant gluing of these films to the abovementioned materials of thermoplastic polymers, wood, aluminum and the like was not possible with the hot melt adhesives known to date.

BRIEF SUMMARY OF THE INVENTION

In view of the abovementioned prior art, the inventors had the object of providing one-component, moisture-curing polyurethane hot melt adhesives which are built up in particular for gluing one- or multilayer surface films based on acrylate or methacrylate polymers or copolymers.

The present invention provides a one-component, moisture-curing polyurethane hot melt adhesive which comprises at least one reaction product with reactive isocyanate groups which is obtained by reaction of at least one di- or polyisocyanate with one or more polyether-polyols, partly crystalline or crystalline polyester-polyols and/or low molecular weight polymers from olefinically unsaturated monomers and optionally tackifying resins.

The present invention also provides the use of the abovementioned polyurethane hot melt adhesives for gluing single- or multilayer (meth)acrylate surface films to substrates of thermoplastics, wood or aluminum. Thermoplastics which are employed here are, in particular, PVC, propylene, ABS, either as factory-new plastics or as recycled products or optionally mixtures of factory-new plastics and recycled products. The polyurethane hot melt adhesive according to the invention is used in particular for gluing multilayer films of a base film based on pigmented (meth)acrylate polymers or (meth)acrylate copolymers and a surface film of methacrylate copolymers, polyvinylidene fluoride or polyvinyl fluoride or a combination thereof.

The present invention also provides a process for laminating 1- or multilayer films of the abovementioned type onto shaped articles of a thermoplastic, wood or aluminum, characterized by the following process steps:

a) the surface treatment of the side of the 1- or multilayer film to be glued is usually carried out by flaming, corona treatment, application of primer or pretreatment with a cleaner or by a combination of the abovementioned treatment methods,
b) the hot melt adhesive is then applied to the surface film
c) the surface of the shaped article is optionally pretreated by application of primer, with a cleaner or by flaming or corona treatment, optionally followed by evaporation of the volatile constituents, optionally with heat being supplied. The surface pretreatment of the surface of the shaped article can also consist of a combination of one or more of the abovementioned methods.
d) the film is then joined to the shaped article, the film optionally being pressed on by suitable means.

In particularly favorable cases, either the surface pretreatment of the surface film or also the pretreatment of the shaped article can be omitted.

To achieve good wetting of the hot melt adhesive with the substrate surfaces, the film and/or shaped article can be heated before application of the adhesive or before the joining.

DETAILED DESCRIPTION OF CERTAIN EMBODIMENTS OF THE INVENTION

All known monomeric diisocyanates are in principle suitable for the preparation of the polyurethane hot melt adhesive. Monomeric di- or polyisocyanates in the context of this invention are those aromatic, aliphatic or cycloaliphatic diisocyanates having molecular weights of less than 500.

Examples of suitable aromatic diisocyanates are all the isomers of toluylene diisocyanate (TDI), either in the isomerically pure form or as a mixture of several isomers, naphthalene 1,5-diisocyanate (NDI), naphthalene 1,4-diisocyanate (NDI), diphenylmethane 4,4'-diisocyanate (MDI), diphenylmethane 2,4'-diisocyanate and mixtures of 4,4'-diphenylmethane diisocyanate with the 2,4' isomer, xylylene diisocyanate (XDI), 4,4'-diphenyl-dimethylmethane diisocyanate, di- and tetraalkyl-diphenylmethane diisocyanates, 4,4'-dibenzyl diisocyanate, 1,3-phenylene diisocyanate and 1,4-phenylene diisocyanate. Examples of suitable cycloaliphatic diisocyanates are the hydrogenation products of the abovementioned aromatic diisocyanates, such as e.g. 4,4'-dicyclohexylmethane diisocyanate ($H_{12}MDI$), 1-isocyanatomethyl-3-isocyanato-1,5,5-trimethyl-cyclohexane (isophorone diisocyanate, IPDI), cyclohexane 1,4-diisocyanate, hydrogenated xylylene diisocyanate ($H_6XDI$), 1-methyl-2,4-diisocyanato-cyclohexane, m- or p-tetramethylxylene diisocyanate (m-TMXDI, pTMXDI) and dimer fatty acid diisocyanate. Examples of aliphatic diisocyanates are tetramethoxybutane 1,4-diisocyanate, butane 1,4-diisocyanate, hexane 1,6-diisocyanate (HDI), 1,6-diisocyanato-2,2,4-trimethylhexane, 1,6-diisocyanato-2,4,4-trimethylhexane, lysine diisocyanate and 1,12-dodecane diisocyanate ($C_{12}DI$). MDI is an isocyanate which is particularly preferably used.

The polypropylene glycols or polybutylene glycols which are known per se are used here as polyether-polyols. Examples are di- and/or trifunctional polypropylene glycols with two or, respectively, three hydroxyl groups per molecule in the molecular weight range from 400 to 20,000, preferably in the range from 1,000 to 6,000. Random and/or block copolymers of ethylene oxide and propylene oxide can also be employed. Another group of polyethers which are preferably to be employed is the polytetramethylene glycols (polybutylene glycols, poly(oxytetramethylene) glycol, poly-THF), which are prepared e.g. by acid polymerization of tetrahydrofuran, the molecular weight range of the polytetramethylene glycols here being between 600 and 6,000, preferably in the range from 800 to 5,000.

Preferably, at least two polyether-polyols are used, one polyether-polyol having an average molecular weight above 1,000 and one polyether-polyol having an average molecular weight below 1,000, the preferred range of the molecular weight for the latter being 400 to 800. Instead of the polyether-polyols, in particular the low molecular weight polyols, alkylene diols, such as e.g. butanediol, hexanediol, octanediol, decanediol or dodecanediol, can also be used.

Suitable polyester-polyols are the crystalline or partly crystalline polyester-polyols which can be prepared by condensation of di- or tricarboxylic acids, such as e.g. adipic acid, sebacic acid, glutaric acid, azelaic acid, suberic acid, undecanedioic acid, dodecandioic acid, 3,3-dimethylglutaric acid, terephthalic acid, isophthalic acid, hexahydrophthalic acid, dimer fatty acid or mixtures thereof, with low molecular weight diols or triols, such as e.g. ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimer fatty alcohol, glycerol, trimethylolpropane or mixtures thereof.

Other groups of polyols which may be employed according to the invention are the polyesters based on ε-caprolactone, also called "polycaprolactones".

However, polyester-polyols of oleochemical origin can also be used. Such polyester-polyols can be prepared, for example, by complete ring-opening of epoxidized triglycerides of a fat mixture which comprises at least partly olefinically unsaturated fatty acids with one or more alcohols having 1 to 12 C atoms and subsequent partial transesterification of the triglyceride derivatives to give alkyl ester polyols having 1 to 12 C atoms in the alkyl radical. Further suitable polyols are polycarbonate-polyols and dimer-diols (product of Henkel), as well as castor oil and derivatives thereof.

The molecular weights stated for the abovementioned polyether-polyols and polyester-polyols are number-average molecular weights, which as a rule are determined by calculation from the hydroxyl number.

"Low molecular weight polymers from olefinically unsaturated monomers" in the context of this invention are polymers prepared from one or more comonomers chosen from acrylic acid, methacrylic acid, $C_1$- to $C_{10}$-alkyl esters of acrylic acid or methacrylic acid, esters of (meth)acrylic acid with glycol ethers, such as methoxyethanol, ethoxyethanol, propoxyethanol and/or butoxyethanol, vinyl esters, such as vinyl acetate, vinyl propionate and vinyl esters of highly branched monocarboxylic acids, such as e.g. versatic acid (product of Shell Chemie), vinyl ethers, fumaric acid esters, maleic acid esters, styrene, alkylstyrenes, butadiene or acrylonitrile and mixtures thereof.

In a preferred embodiment, these low molecular weight polymers have active hydrogen groups in the form of hydroxyl groups or primary or secondary amino groups, so that these low molecular weight polymers can be co-bonded chemically into the polymer matrix of the hot melt adhesive. The low molecular weight polymers are conventionally prepared by free-radical polymerization or copolymerization of the abovementioned monomers. For incorporation of the active hydrogen groups, hydroxyethyl (meth)acrylate, hydroxypropyl (meth)acrylate, hydroxybutyl (meth)acrylate or esters of acrylic acid or methacrylic acid with glycol oligomers or polymers, such as e.g. di-, tri-, tetra- and/or polyethylene glycol can be copolymerized with the abovementioned monomers. Instead of the abovementioned hydroxy-functional (meth)acrylates, the corresponding amino-functional comonomers can also be used. The molecular weight range of the low molecular weight polymers from olefinically unsaturated monomers is between 10,000 and 150,000 dalton, preferably 20,000 and 80,000 dalton. The average molecular weight is determined here, as is conventional for copolymers obtained by free-radical polymerization, by a standard gel permeation chromatography (GPC), the latter occasionally also being called "size exclusion chromatography" (SEC). For this, the average molecular weight is calibrated against an external polystyrene standard of certified molecular weight.

If OH-functional polymers are used, these should have an OH number (DIN 53783) of 0.5 to 20, preferably between 1 and 15. Particularly suitable low molecular weight polymers with active hydrogen groups are disclosed in WO 99/28363 on page 13 to 14. The disclosures of this publication and corresponding U.S. Pat. No. 6,465,104 are each incorporated by reference herein in their entirety.

Tackifying resins which can be used are e.g. abietic acid, abietic acid esters, terpene resins, terpene-phenol resins, phenol-modified styrene polymers, phenol-modified α-methylstyrene polymers or hydrocarbon resins.

In a preferred embodiment, these tackifying resins can contain active hydrogen atoms, so that these can be coincorporated into the binder matrix of the hot melt adhesive during the reaction with the di- or polyisocyanates. Concrete examples of these are hydroxy-functional esters of abietic acid or also hydroxylated terpene-phenol resins.

In a particularly preferred embodiment, polyurethane compositions with no or a very low content of monomeric, low molecular weight diisocyanates can be employed as the polyurethane hot melt adhesives according to the invention. Such hot melt adhesive compositions are the subject matter e.g. of WO 01/40342. The disclosures of this published application and corresponding U.S. application Ser. No. 10/148,432 are each incorporated herein by reference in their entirety.

The hot melt adhesives according to the invention can furthermore additionally comprise stabilizers, adhesion-promoting additives, fillers, pigments, plasticizers and/or catalysts.

"Stabilizers" in the context of this invention are to be understood on the one hand as stabilizers which effect stability of the viscosity of the polyurethane prepolymer during preparation, storage or application. Monofunctional carboxylic acid chlorides, monofunctional highly reactive isocyanates, and also non-corrosive inorganic acids e.g. are suitable for this, examples which may be mentioned being benzoyl chloride, toluenesulfonyl isocyanate, phosphoric acid or phosphorous acid. Antioxidants, UV stabilizers or hydrolysis stabilizers are furthermore to be understood as stabilizers in the context of this invention. The choice of these stabilizers depends on the one hand on the main components of the composition, and on the other hand on the application conditions and the loads to be expected on the cured product. If the polyurethane prepolymer is built up predominantly from polyether units, antioxidants, optionally in combination with UV stabilizers, are chiefly necessary. Examples of these are the commercially available sterically hindered phenols and/or thioethers and/or substituted benzotriazoles or the sterically hindered amines of the HALS ("hindered amine light stabilizer") type.

If essential constituents of the polyurethane prepolymer comprise polyester units, hydrolysis stabilizers, e.g. of the carbodiimide type, can be employed.

Catalysts optionally contained in the system can accelerate, in a known manner, the formation of the polyurethane prepolymer during its preparation and/or the moisture-crosslinking after application of the adhesive. Suitable catalysts here which can be employed according to the invention are, in particular, the organotin and/or aminic catalysts mentioned in the abovementioned WO 01/40342 on page 11 to 13, in the amounts stated there.

In particularly preferred embodiments the polyurethane hot melt adhesives according to the invention can comprise 5 to 15 wt. %, preferably 8 to 12 wt. % of a diisocyanate, preferably diphenylmethane diisocyanate with 20 to 40 wt. %, preferably 25 to 40 wt. % of a difunctional polypropylene glycol with a molecular weight of between 2,000 and 6,000, 2 to 8 wt. % of a polypropylene glycol or alkylene diol with a molecular weight of between 200 and 600, 15 to 30 wt. %, preferably 20 to 25 wt. % of a crystalline or partly crystalline polyester-polyol, 10 to 35 wt. %, preferably 15 to 30 wt. % of a low molecular weight polymer of olefinically unsaturated monomers, preferably with hydroxyl groups, 2 to 8 wt. % of a preferably hydroxylated tackifying resin, 0.01 to 0.1 wt. % of an acid stabilizer of the abovementioned type.

The sum of the abovementioned constituents here is 100 wt. %.

In principle the abovementioned reactive products can be prepared separately by reaction with the diisocyanate, and the isocyanate-functional reactants prepared separately in this way can then be mixed in the desired amount. Further possibilities for the preparation are disclosed in WO 99/28363 on page 16 and page 17, the disclosures of each of which are incorporated herein by reference in their entirety. In a preferred embodiment, the polyurethane hot melt adhesives according to the invention are prepared in a one-stage reaction, or if functional low molecular weight polymers are used, the total amount of the low molecular weight polymer is mixed into a small amount of one or more of the polyols, followed by addition of the total amount of the polyisocyanate. After the end of this reaction, the remaining amount of the polyols or polyol mixtures is added.

The invention is described in the following with the aid of some experiments in principle, where the choice of examples is not intended to represent a limitation of the scope of the subject matter of the invention. They merely show by way of a model the mode of action of the hot melt adhesives to be used according to the invention and their advantages in the gluing of one- or multilayer surface films based on acrylate or methacrylate polymers to profiles of plastics, such as are conventionally employed in window construction.

In the following examples, all the amounts stated are percentages by weight or parts by weight, unless stated otherwise.

EXAMPLES

Example 1

A reactive hot melt adhesive composition with free isocyanate groups was prepared from the following constituents in a heatable stirred tank:

| | |
|---|---:|
| Polypropylene glycol, MW 2,000, OH number 56 | 32.18% |
| Polypropylene glycol, MW 400, OH number 260 | 4.87% |
| Partly crystalline polyester based on hexanediol adipate, OH number 30.5 | 21.46% |
| Acrylic copolymer, MW 34,000, OH number 2.1 | 24.38% |
| Hydroxylated tackifier resin, OH number 75 | 4.87% |
| 4-Toluenesulfonyl isocyanate | 0.03% |
| 4,4'-Diphenylmeethane diisocyanate | 12.21% |

After the end of the reaction of the isocyanate groups with the hydroxyl groups, the hot melt adhesive composition was introduced in the conventional manner into containers which close moisture-tight, and had the following characteristic values:

NCO content: 1.15%; viscosity of the melt at 130° C.: 17 Pa·s, measured with a Brookfield viscometer equipped with Thermosel.

For lamination of PVC window profiles, the reactive hot melt adhesive according to example 1 was used for gluing to a standard PVC window profile a multilayer window decorative film based on a pigmented acrylic film with a transparent, colorless acrylic/polyvinylidene fluoride coextruded film as the surface layer. The acrylate side was used as the gluing side of the decorative film. Gluing was carried out on a standard profile sheathing machine of the type Friz, DTC-2, the PVC profile having been pretreated with a solvent-based primer 6-B-23 from Henkel Dorus. The knife gap of the sheathing machine was 50 μm, the hot melt adhesive temperature was 130° C. and the temperature of the PVC profile was 55° C. The gluing was tested for its peel strength after 10 min, 1 h, 1 day and 7 days and after ageing (7 days, 70° C. with exposure to water). The results are summarized in the following table.

| | | | Peel strength (N/20 mm) after: | | | | |
|---|---|---|---|---|---|---|---|
| Example | Film | Adhesive | 10 min | 1 h | 1 d | 7 d | After ageing 7d/70° C., water |
| 2 | FAST | Ex. 1 | 7 | 20 | 48, FT | 50, FT | 81, FT |
| 3 | FAST | Ex. 1 | 4 | 20 | 75, FT | 76, FT | — |
| 4 | FAST | QR5305 | 5 | 9 | 42, AF-F | 51, AF-F | 40, AF-F |
| 5 | FAST | QR3530-24 | 2 | 8 | 22 | 46, AF-F | 40, AF-F |
| 6 | MBAS 2 | Ex. 1 | 6 | 16 | 72, FT | 86, FT | 67, FT |
| 7 | MBAS 2 | QR5305 | 3 | 4 | 42 | 84, FT | 43 |

QR5305 = PURMELT QR5305 adhesive, Henkel KGaA
QR3530-24 = PURMELT QR3530-24 adhesive, Henkel KGaA
FAST = multilayer film based on pigmented acrylic film, Renolit
MBAS 2 = standard PVC film
FT = film tears without peeling
AF-F = adhesion fracture to the film
no result = peels with cohesion fracture As can be seen from the above values, the hot melt adhesive according to example 1 is superior to commercially available polyurethane hot melt adhesives (QR 5305) and commercially available acrylate-based hot melt adhesives (QR 3530-24) in respect of the initial peel strength and of the final peel strength, also after ageing, when the highly light-stable multilayer films based on acrylic base films are used for the gluing. At the same time, the hot melt adhesive according to the invention according to example 1 is also suitable for gluing conventional PVC films (see example 6).

What is claimed is:

1. A one-component, moisture-curing polyurethane hot melt adhesive comprising at least one reaction product with reactive NCO groups produced by reaction of
   a) 5 to 15 weight percent of at least one di- or polyisocyanate;
   b) 20 to 40 weight percent difunctional polypropylene glycol having a molecular weight of from 2,000 to 6,000;
   c) 15 to 30 weight percent of at least one crystalline or partly crystalline polyester-polyol;
   d) 10 to 35 weight percent of at least one low molecular weight polymer obtained by polymerization of one or more olefinically unsaturated monomers;
   e) 2 to 8 weight percent of a polypropylene glycol or alkylene diol having a molecular weight of from 200 to 600; and
   f) 2 to 8 weight percent of a tackifying resin.

2. An adhesive according to claim 1, wherein at least one low molecular weight polymer has active hydrogen groups.

3. An adhesive according to claim 1, wherein at least one tackifying resin having active hydrogen groups is used to produce said at least one reaction product.

4. An adhesive according to claim 1, wherein said reaction product is produced using 8 to 12 weight percent of diphenylmethane diisocyanate, 25 to 40 weight percent of a difunctional polypropylene glycol with a molecular weight of from 2,000 to 6,000, 2 to 8 weight percent of a polypropylene glycol or alkylene diol with a molecular weight of from 200 to 600, 20 to 25 weight percent of a crystalline or partially crystalline polyester-polyol, 15 to 30 weight percent of said low molecular weight polymer, wherein said low molecular weight polymer has hydroxyl groups, 2 to 8 weight percent of a hydroxylated tackifying resin, and 0.01 to 0.1 weight percent of an acid stabilizer.

5. An adhesive according to claim 1, wherein said low molecular weight polymer is an acrylic copolymer.

6. An adhesive according to claim 1, wherein said low molecular weight polymer has an OH number of from 0.5 to 20.

7. A method for gluing a poly(meth)acrylate film to a substrate comprised of a thermoplastic, wood or aluminum, said method comprising using an adhesive to join said poly(meth)acrylate film to said substrate, wherein said adhesive is a one-component, moisture-curing hot melt adhesive and comprises at least one reaction product with reactive NCO groups produced by reaction of
   a) at least one di- or polyisocyanate;
   b) at least two diols selected from the group consisting of polyether-polyols and alkylene diols, wherein at least one diol has an average molecular weight above 1,000 and at least one diol has an average molecular weight not greater than 800;
   c) at least one crystalline or partly crystalline polyester-polyol; and
   d) at least one low molecular weight polymer obtained by polymerization of one or more olefinically unsaturated monomers;
and wherein the reaction product in said adhesive is produced using 5 to 15 weight percent diisocyanate, 20 to 40 weight percent difunctional polypropylene glycol having a molecular weight of from 2,000 to 6,000, 2 to 8 weight percent of a polypropylene glycol or alkylene diol having a molecular weight of from 200 to 600, 15 to 30 weight % of a crystalline or partially crystalline polyester-polyol, 10 to 35 weight percent of said low molecular weight polymer, and 2 to 8 weight percent of a tackifying resin.

8. A method according to claim 7, wherein said substrate is comprised of a thermoplastic selected from the group consisting of PVC, polypropylene and ABS.

9. A method according to claim 7, wherein the poly(meth)acrylate film comprises a base film comprising at least one pigmented (meth)acrylate polymer or copolymer in combination with a surface film comprising at least one colorless methacrylate copolymer, polyvinylidene fluoride or polyvinyl fluoride, wherein a surface of said base film is joined to said substrate.

10. A method according to claim 7, wherein the reaction product in said adhesive is produced using 8 to 12 weight percent of diphenylmethane diisocyanate, 25 to 40 weight percent of a difunctional polypropylene glycol with a molecular weight of from 2,000 to 6,000, 2 to 8 weight percent of a polypropylene glycol or alkylene diol with a molecular weight of from 200 to 600, 20 to 25 weight percent of a crystalline or partially crystalline polyester-polyol, 15 to 30 weight percent of said low molecular weight polymer, wherein said low molecular weight polymer has hydroxyl groups, 2 to 8 weight percent of a hydroxylated tackifying resin, and 0.01 to 0.1 weight percent of an acid stabilizer.

11. A method according to claim 7, wherein the poly(meth)acrylate film is surface treated prior to applying the adhesive by at least one procedure selected from the group consisting of corona treatment, application of a primer, and pre-treatment with a cleaner.

12. A method for laminating a poly(meth)acrylate film onto a shaped article comprised of polyvinyl chloride (PVC), polypropylene, acrylonitrile/butadiene/styrene copolymer, wood or aluminum, said method comprising:
   a) applying an adhesive to the film; and
   b) joining the poly(meth)acrylate film to a surface of the shaped article;
wherein said adhesive is a one-component, moisture-curing hot melt adhesive and comprises at least one reaction product with reactive NCO groups produced by reaction of
   i) at least one di- or polyisocyanate;
   ii) at least two diols selected from the group consisting of polyether-polyols and alkylene diols, wherein at least one diol has an average molecular weight above 1,000 and at least one diol has an average molecular weight not greater than 800;
   (iii) at least one crystalline or partly crystalline polyester-polyol; and
   (iv) at least one low molecular weight polymer obtained by polymerization of one or more olefinically unsaturated monomers;
and wherein the reaction product in said adhesive is produced using 5 to 15 weight percent diisocyanate, 20 to 40 weight percent difunctional polypropylene glycol having a molecular weight of from 2,000 to 6,000, 2 to 8 weight percent of a polypropylene glycol or alkylene diol having a molecular weight of from 200 to 600, 15 to 30 weight % of a crystalline or partially crystalline polyester-polyol, 10 to 35 weight percent of said low molecular weight polymer, and 2 to 8 weight percent of a tackifying resin.

13. A method according to claim 12, wherein the poly(meth)acrylate film is surface treated prior to applying the adhesive by at least one procedure selected from the group consisting of corona treatment, application of a primer, and pre-treatment with a cleaner.

14. A method according to claim 12, wherein said poly(meth)acrylate film is pressed onto the surface of the shaped article during step b.

15. A method according to claim 12, wherein said poly(methacrylate film is preheated prior to step a.

16. A method according to claim 12, wherein said surface of the shaped article is pretreated before step b by at least one procedure selected from the group consisting of application of a primer and treatment with a cleaner.

17. A method according to claim 12, wherein the reaction product in said adhesive is produced using 8 to 12 weight percent of diphenylmethane diisocyanate, 25 to 40 weight percent of a difunctional polypropylene glycol with a molecular weight of from 2,000 to 6,000, 2 to 8 weight percent of a polypropylene glycol or alkylene diol with a molecular weight of from 200 to 600, 20 to 25 weight percent of a crystalline or partially crystalline polyester-polyol, 15 to 30 weight percent of said low molecular weight polymer, wherein said low molecular weight polymer has hydroxyl groups, 2 to 8 weight percent of a hydroxylated tackifying resin, and 0.01 to 0.1 weight percent of an acid stabilizer.

* * * * *

UNITED STATES PATENT AND TRADEMARK OFFICE
CERTIFICATE OF CORRECTION

PATENT NO. : 7,300,996 B2 Page 1 of 1
APPLICATION NO. : 10/817558
DATED : November 27, 2007
INVENTOR(S) : Hoffmann et al.

It is certified that error appears in the above-identified patent and that said Letters Patent is hereby corrected as shown below:

Title page, column 1, insert item --(30) Foreign Application Priority Data, Oct. 5, 2001 (DE) 101 49 142.5--.

Signed and Sealed this

Sixth Day of May, 2008

JON W. DUDAS
*Director of the United States Patent and Trademark Office*